United States Patent
Hasinoff et al.

(10) Patent No.: US 10,187,587 B2
(45) Date of Patent: Jan. 22, 2019

(54) LIVE UPDATES FOR SYNTHETIC LONG EXPOSURES

(71) Applicant: Google LLC, Moutain View, CA (US)

(72) Inventors: Samuel William Hasinoff, Mountain View, CA (US); Jiawen Chen, Mountain View, CA (US)

(73) Assignee: Google LLC, Mountain View, CA (US)

( * ) Notice: Subject to any disclaimer, the term of this patent is extended or adjusted under 35 U.S.C. 154(b) by 3 days.

(21) Appl. No.: 15/097,687

(22) Filed: Apr. 13, 2016

(65) Prior Publication Data

US 2017/0302840 A1 Oct. 19, 2017

(51) Int. Cl.
| | |
|---|---|
| H04N 5/235 | (2006.01) |
| H04N 5/238 | (2006.01) |
| H04N 1/21 | (2006.01) |
| H04N 5/232 | (2006.01) |
| H04N 5/355 | (2011.01) |

(52) U.S. Cl.
CPC ......... *H04N 5/2353* (2013.01); *H04N 1/2137* (2013.01); *H04N 5/2355* (2013.01); *H04N 5/23216* (2013.01); *H04N 5/23293* (2013.01); *H04N 5/35581* (2013.01)

(58) Field of Classification Search
CPC ............. H04N 5/2353; H04N 5/23293; H04N 5/35581; H04N 5/23216; H04N 1/2137
See application file for complete search history.

(56) References Cited

U.S. PATENT DOCUMENTS

| | | | |
|---|---|---|---|
| 7,027,172 B1* | 4/2006 | Parulski | H04N 1/00132 358/1.15 |
| 2004/0169739 A1* | 9/2004 | Aoyama | G11B 27/034 348/223.1 |
| 2007/0008341 A1* | 1/2007 | Endo | G06T 19/006 345/633 |
| 2007/0115368 A1* | 5/2007 | Kamiya | H04N 1/2112 348/220.1 |

(Continued)

FOREIGN PATENT DOCUMENTS

| | | |
|---|---|---|
| CN | 102316331 | 8/2014 |
| CN | 103293825 | 11/2014 |

(Continued)

OTHER PUBLICATIONS

Adams et al., "Viewfinder Alignment," Computer Graphics Forum, 2008, pp. 597-606, vol. 27, No. 2.

(Continued)

*Primary Examiner* — Lin Ye
*Assistant Examiner* — John Morehead
(74) *Attorney, Agent, or Firm* — McDonnell Boehnen Hulbert & Berghoff LLP

(57) ABSTRACT

An image sensor of an image capture device may capture an image. The captured image may be stored in a buffer of two or more previously-captured images. An oldest image of the two or more previously-captured images may be removed from the buffer. An aggregate image of the images in the buffer may be updated. This updating may involve subtracting a representation of the oldest image from the aggregate image, and adding a representation of the captured image to the aggregate image. A viewfinder of the image capture device may display a representation of the aggregate image.

19 Claims, 8 Drawing Sheets

(56) References Cited

U.S. PATENT DOCUMENTS

| | | | |
|---|---|---|---|
| 2007/0116450 A1* | 5/2007 | Kijima | G03B 7/095 396/111 |
| 2008/0002030 A1* | 1/2008 | Sakurai | G06T 5/009 348/207.99 |
| 2008/0136940 A1* | 6/2008 | Srikanth | H04N 1/00307 348/231.99 |
| 2008/0136942 A1* | 6/2008 | Yoon | H04N 5/23293 348/231.99 |
| 2009/0160968 A1* | 6/2009 | Prentice | H04N 5/23245 348/223.1 |
| 2009/0189994 A1* | 7/2009 | Shimonaka | H04N 5/2251 348/222.1 |
| 2010/0073516 A1 | 3/2010 | Minakuti et al. | |
| 2010/0085444 A1* | 4/2010 | Konishi | G03B 19/18 348/231.99 |
| 2011/0074973 A1* | 3/2011 | Hayashi | H04N 5/232 348/222.1 |
| 2012/0257004 A1* | 10/2012 | Smith | H04N 7/144 348/14.16 |
| 2013/0222623 A1 | 8/2013 | McLeod | |
| 2014/0104455 A1* | 4/2014 | Lee | H04N 5/23232 348/223.1 |
| 2014/0111670 A1* | 4/2014 | Lord | H04N 5/23206 348/240.99 |
| 2014/0354850 A1* | 12/2014 | Kosaka | H04N 5/23216 348/231.5 |
| 2015/0138406 A1* | 5/2015 | Sokeila | H04N 5/23245 348/262 |
| 2015/0294649 A1* | 10/2015 | Imamura | G09G 5/36 345/641 |
| 2016/0227102 A1* | 8/2016 | Iwasaki | H04N 5/23212 |
| 2017/0132756 A1* | 5/2017 | Campbell | G06T 3/4015 |

FOREIGN PATENT DOCUMENTS

| | | |
|---|---|---|
| JP | 2003069897 | 3/2003 |
| JP | 4323969 B2 | 9/2009 |
| WO | 2015/184208 | 12/2015 |

OTHER PUBLICATIONS

International Searching Authority, International Search Report and Written Opinion dated May 4, 2017, issued in connection with International Application No. PCT/WO2017/018032, filed on Feb. 16, 2017, 15 pages.

Smith, Steven W., Ph.D., "Chapter 15 —Moving Average Filters," The Scientist and Engineer's Guild to Digital Signal Processing, 1997, pp. 277-284.

"Camera FV-5—Android Apps on Google Play," http://play.google.com/store/apps/details?id=com.flavionet.android.camera.pro, Feb. 15, 2016, 4 pages.

"Magic Shutter," Anistar Studio, https://itunes.apple.com/app/magic-shutter/id408256708, Feb. 15, 2016, 3 pages.

"Slow Shutter Cam," Cogitap Software, https://itunes.apple.com/us/app/slow-shutter-cam/id357404131?mt=8, Feb. 15, 2016, 4 pages.

Telleen et al., "Synthetic Shutter Speed Imaging," Eurographics, 2007, pp. 1-8, vol. 26, No. 3.

\* cited by examiner

LIVE UPDATES FOR SYNTHETIC LONG EXPOSURES

BACKGROUND

Creating a synthetic long exposure version of an image captured with a particular exposure length may involve applying a digital or analog gain to at least some pixels of image. In this way, an image of a low-light scene can be brightened so that, in some cases, details of the scene are more easily visible. While such a synthetic long exposure image can be displayed on a viewfinder of an image capture device, the displayed image might not accurately represent what would result if a true long exposure image were captured. For instance, if there is motion in the scene, this motion may appear with blurs or streaks in the true long exposure image, but the motion will likely be less blurry and/or less streaky in the synthetic long exposure image. As a consequence, a user could become frustrated by the image capture device not accurately representing actual captured long exposure images on its viewfinder.

SUMMARY

Image capture devices, such as wireless computing devices, digital cameras, head-mounted displays, and so on, may include a viewfinder (e.g., a screen) that displays a series of captured images representing a scene. These viewfinder images may be captured consecutively in time, perhaps a few milliseconds (or less) apart from one another, and sequentially displayed on the viewfinder. Thus, the information displayed on the viewfinder may be updated at a viewfinder refresh rate (e.g., 15-30 frames per second), so that the series of viewfinder images resemble live video. A user may rely on these viewfinder images when adjusting the settings of the image capture device and/or triggering a shutter function to capture one or more payload images. The payload images may be stored to memory for display or further processing.

Given that the image capture device is already capturing viewfinder images, a synthetic long exposure of these viewfinder images can be created by adding pixel values of a sequence of successive viewfinder images. A ring buffer (or similar representation) of captured viewfinder images may be maintained. Further, a running sum of the most recent viewfinder images may be maintained in an aggregate viewfinder image. When a new viewfinder image is captured, this new image is added to the aggregate viewfinder image, and the oldest frame contributing to the aggregate viewfinder image (as indicated by the ring buffer) is subtracted from the aggregate viewfinder image. The new viewfinder image then replaces the oldest frame in the ring buffer.

Each time the viewfinder refreshes, the aggregate viewfinder image may be displayed on the viewfinder, instead of the most recently captured viewfinder image. In this fashion, the viewfinder may represent a very long exposure (e.g., 1000-2000 milliseconds), with the expected motion blur, but will still update at the much faster viewfinder refresh rate.

Accordingly, a first example embodiment may involve an image sensor of an image capture device capturing an image. The captured image may be stored in a buffer of two or more previously-captured images. An oldest image of the two or more previously-captured images may be removed from the buffer. An aggregate image of the images in the buffer may be updated. This updating may involve subtracting a representation of the oldest image from the aggregate image, and adding a representation of the captured image to the aggregate image. A viewfinder of the image capture device may display a representation of the aggregate image.

In a second example embodiment, an article of manufacture may include a non-transitory computer-readable medium, having stored thereon program instructions that, upon execution by a computing device, cause the computing device to perform operations in accordance with the first example embodiment.

In a third example embodiment, a computing device may include at least one processor, as well as data storage and program instructions. The program instructions may be stored in the data storage, and upon execution by the at least one processor may cause the computing device to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
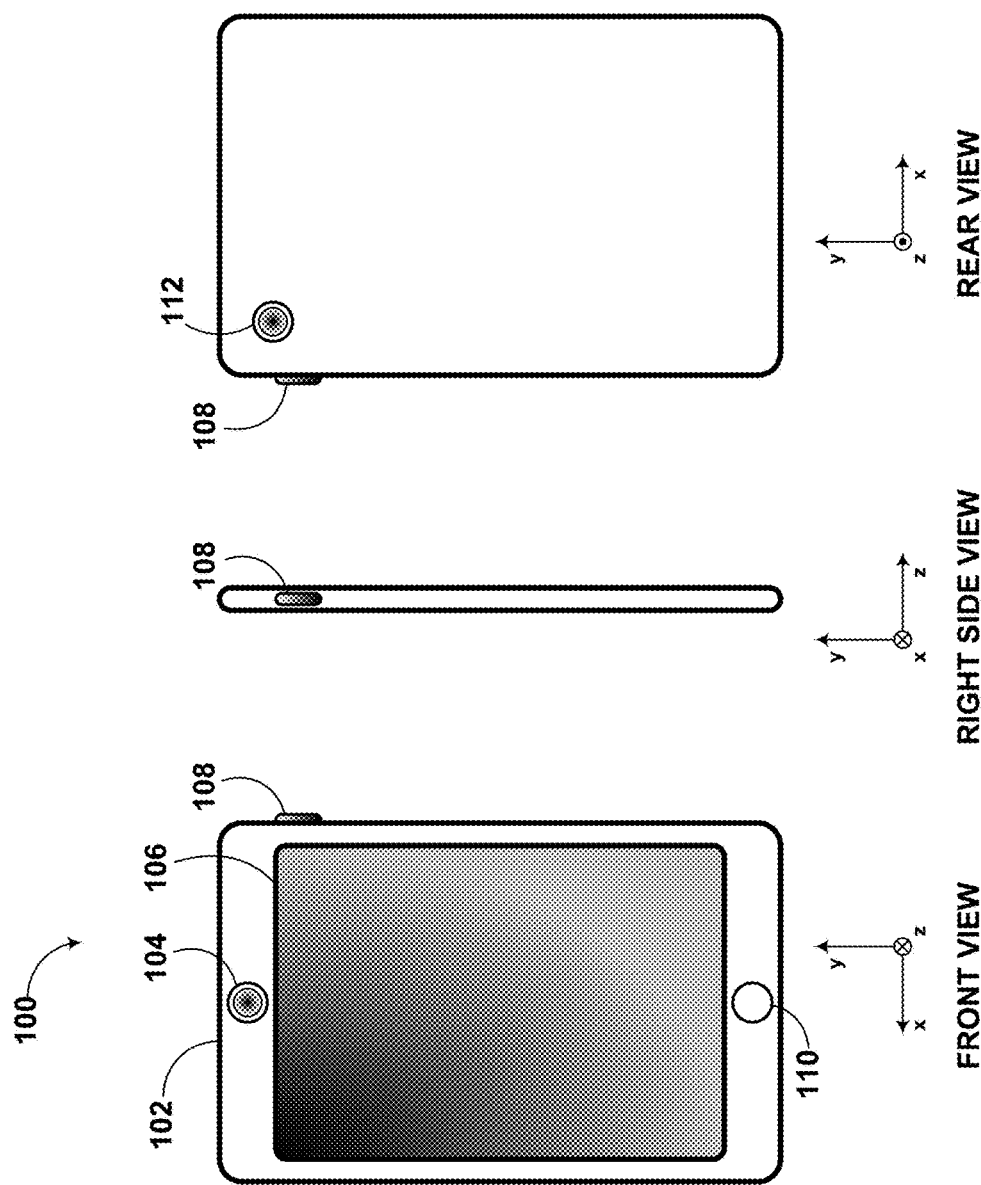
FIG. 1 depicts front, right side, and rear views of a digital camera device, according to example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Depending on context, a "camera" may refer to an individual image capture component, or a device that contains one or more image capture components. In general, image capture components may include an aperture, lens, recording surface, and shutter, as described below.

1. Example Image Capture Devices

As image capture devices, such as cameras, become more popular, they may be employed as standalone hardware devices or integrated into various other types of devices. For instance, still and video cameras are now regularly included in wireless computing devices (e.g., mobile phones), tablet computers, laptop computers, video game interfaces, home automation devices, and even automobiles and other types of vehicles.

The physical components of a camera may include one or more apertures through which light enters, one or more recording surfaces for capturing the images represented by the light, and lenses positioned in front of each aperture to focus at least part of the image on the recording surface(s). The apertures may be fixed size or adjustable. In an analog camera, the recording surface may be photographic film. In a digital camera, the recording surface may include an electronic image sensor (e.g., a charge coupled device (CCD) or a complementary metal-oxide-semiconductor (CMOS) sensor) to transfer and/or store captured images in a data storage unit (e.g., memory).

One or more shutters may be coupled to or nearby the lenses or the recording surfaces. Each shutter may either be in a closed position, in which it blocks light from reaching the recording surface, or an open position, in which light is allowed to reach to recording surface. The position of each shutter may be controlled by a shutter button. For instance, a shutter may be in the closed position by default. When the shutter button is triggered (e.g., pressed), the shutter may change from the closed position to the open position for a period of time, known as the shutter cycle. During the shutter cycle, an image may be captured on the recording surface. At the end of the shutter cycle, the shutter may change back to the closed position.

Alternatively, the shuttering process may be electronic. For example, before an electronic shutter of a CCD image sensor is "opened," the sensor may be reset to remove any residual signal in its photodiodes. While the electronic shutter remains open, the photodiodes may accumulate charge. When or after the shutter closes, these charges may be transferred to longer-term data storage. Combinations of mechanical and electronic shuttering may also be possible.

Regardless of type, a shutter may be activated and/or controlled by something other than a shutter button. For instance, the shutter may be activated by a softkey, a timer, or some other trigger. Herein, the term "image capture" may refer to any mechanical and/or electronic shuttering process that results in one or more images being recorded, regardless of how the shuttering process is triggered or controlled.

The exposure of a captured image may be determined by a combination of the size of the aperture, the brightness of the light entering the aperture, and the length of the shutter cycle (also referred to as the shutter length or the exposure length). Additionally, a digital and/or analog gain may be applied to the image, thereby influencing the exposure. In some embodiments, the term "exposure length," "exposure time," or "exposure time interval" may refer to the shutter length multiplied by the gain for a particular aperture size. Thus, these terms may be used somewhat interchangeably, and should be interpreted as possibly being a shutter length, an exposure time, and/or any other metric that controls the amount of signal response that results from light reaching the recording surface.

A still camera may capture one or more images each time image capture is triggered. A video camera may continuously capture images at a particular rate (e.g., 24 images —or frames—per second) as long as image capture remains triggered (e.g., while the shutter button is held down). Some digital still cameras may open the shutter when the camera device or application is activated, and the shutter may remain in this position until the camera device or application is deactivated. While the shutter is open, the camera device or application may capture and display a representation of a scene on a viewfinder. When image capture is triggered, one or more distinct payload images of the current scene may be captured.

Cameras—even analog cameras—may include software to control one or more camera functions and/or settings, such as aperture size, exposure length, gain, and so on. Additionally, some cameras may include software that digitally processes images during or after image capture. While the description above refers to cameras in general, it may be particularly relevant to digital cameras.

As noted previously, digital cameras may be standalone devices or integrated with other devices. As an example, FIG. 1 illustrates the form factor of a digital camera device 100. Digital camera device 100 may be, for example, a mobile phone, a tablet computer, or a wearable computing device. However, other embodiments are possible. Digital camera device 100 may include various elements, such as a body 102, a front-facing camera 104, a multi-element display 106, a shutter button 108, and other buttons 110. Digital camera device 100 could further include a rear-facing camera 112. Front-facing camera 104 may be positioned on a side of body 102 typically facing a user while in operation, or on the same side as multi-element display 106. Rear-facing camera 112 may be positioned on a side of body 102 opposite front-facing camera 104. Referring to the cameras as front and rear facing is arbitrary, and digital camera device 100 may include multiple cameras positioned on various sides of body 102.

Multi-element display 106 could represent a cathode ray tube (CRT) display, a light emitting diode (LED) display, a liquid crystal (LCD) display, a plasma display, or any other type of display known in the art. In some embodiments, multi-element display 106 may display a digital representation of the current image being captured by front-facing camera 104 and/or rear-facing camera 112, or an image that could be captured or was recently captured by either or both of these cameras. Thus, multi-element display 106 may serve as a viewfinder for either camera. Multi-element display 106 may also support touchscreen and/or presence-sensitive functions that may be able to adjust the settings and/or configuration of any aspect of digital camera device 100.

Front-facing camera 104 may include an image sensor and associated optical elements such as lenses. Front-facing camera 104 may offer zoom capabilities or could have a fixed focal length. In other embodiments, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent a monoscopic, stereoscopic, or multiscopic camera. Rear-facing camera 112 may be similarly or differently arranged. Additionally, front-facing camera 104, rear-facing camera 112, or both, may be an array of one or more cameras.

Either or both of front facing camera 104 and rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the embodiments herein.

Either or both of front facing camera 104 and rear-facing camera 112 may include or be associated with an ambient light sensor that may continuously or from time to time determine the ambient brightness of a scene that the camera can capture. In some devices, the ambient light sensor can be used to adjust the display brightness of a screen associated with the camera (e.g., a viewfinder). When the determined ambient brightness is high, the brightness level of the screen may be increased to make the screen easier to view. When the determined ambient brightness is low, the brightness level of the screen may be decreased, also to make the screen easier to view as well as to potentially save power. Additionally, the ambient light sensor's input may be used to determine an exposure length of an associated camera, or to help in this determination.

Digital camera device 100 could be configured to use multi-element display 106 and either front-facing camera 104 or rear-facing camera 112 to capture images of a target object. The captured images could be a plurality of still images or a video stream. The image capture could be triggered by activating shutter button 108, pressing a softkey on multi-element display 106, or by some other mechanism. Depending upon the implementation, the images could be captured automatically at a specific time interval, for example, upon pressing shutter button 108, upon appropriate lighting conditions of the target object, upon moving digital camera device 100 a predetermined distance, or according to a predetermined capture schedule.

As noted above, the functions of digital camera device 100—or another type of digital camera—may be integrated into a computing device, such as a wireless computing device, cell phone, tablet computer, laptop computer and so on. For purposes of example, FIG. 2 is a simplified block diagram showing some of the components of an example computing device 200 that may include camera components 224.

By way of example and without limitation, computing device 200 may be a cellular mobile telephone (e.g., a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, or some other type of device equipped with at least some image capture and/or image processing capabilities. It should be understood that computing device 200 may represent a physical camera device such as a digital camera, a particular physical hardware platform on which a camera application operates in software, or other combinations of hardware and software that are configured to carry out camera functions.

Figure 2:
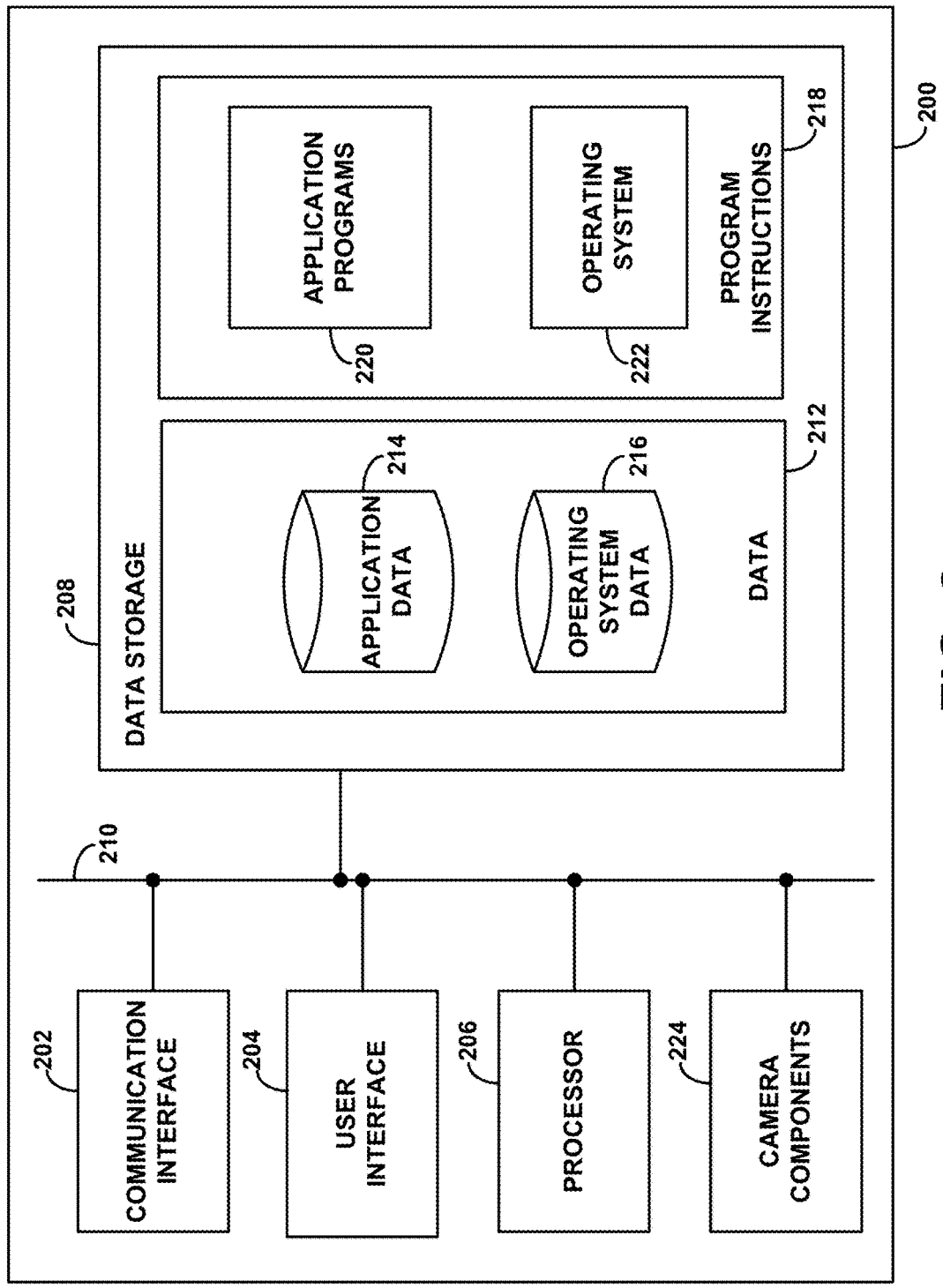
FIG. 2 depicts a block diagram of a computing device with image capture capability, according to example embodiments.

As shown in FIG. 2, computing device 200 may include a communication interface 202, a user interface 204, a processor 206, data storage 208, and camera components 224, all of which may be communicatively linked together by a system bus, network, or other connection mechanism 210.

Communication interface 202 may allow computing device 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wifi interface, a BLUETOOTH® interface, and a wide-area wireless interface).

User interface 204 may function to allow computing device 200 to interact with a human or non-human user, such as to receive input from a user and to provide output to the user. Thus, user interface 204 may include input components such as a keypad, keyboard, touch-sensitive or presence-sensitive panel, computer mouse, trackball, joystick, microphone, and so on. User interface 204 may also include one or more output components such as a display screen which, for example, may be combined with a presence-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices.

In some embodiments, user interface 204 may include a display that serves as a viewfinder for still camera and/or video camera functions supported by computing device 200. Additionally, user interface 204 may include one or more buttons, switches, knobs, and/or dials that facilitate the configuration and focusing of a camera function and the capturing of images (e.g., capturing a picture). It may be possible that some or all of these buttons, switches, knobs, and/or dials are implemented by way of a presence-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities.

Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, and/or gaming applications) installed on computing device 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing device 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some vernaculars, application programs 220 may be referred to as "apps" for short. Additionally, application programs 220 may be downloadable to computing device 200 through one or more online application stores or application markets. However, application programs can also be installed on computing device 200 in other ways, such as via a web browser or through a physical interface (e.g., a USB port) on computing device 200.

Camera components 224 may include, but are not limited to, an aperture, shutter, recording surface (e.g., photographic film and/or an image sensor), lens, and/or shutter button. Camera components 224 may be controlled at least in part by software executed by processor 206.

2. Example Synthetic Exposures

As noted above, many image capture devices include a viewfinder. When the device's aperture is open and/or when the device is otherwise ready to capture a payload image, preview images may be displayed in the viewfinder. These preview images may be refreshed at a particular rate, referred to as the viewfinder refresh rate. In some cases, the viewfinder refresh rate is 15 Hz or 30 Hz, but other rates may be used. These refresh rates define the viewfinder's refresh time interval, which is the amount of time between refreshes. The refresh time interval is the inverse of the refresh rate—thus, a refresh rate of 30 Hz has a refresh time interval of 33.33 milliseconds, while a refresh rate of 15 Hz has a refresh time interval of 66.66 milliseconds.

A user may utilize the preview images to aim, focus, or otherwise adjust the image capture device. In some situations, once the user is satisfied by what he or she sees on the viewfinder, the user triggers the image capture device's shutter function. This may result in a payload image being captured, possibly with higher resolution than the viewfinder images. The payload image is stored to memory and/or presented to the user as the actual photographed image. The user may then share, print, or further manipulate this payload image.

In some cases, the user might find it desirable to capture a payload image with a long exposure length. For instance, if the user is attempting to capture an image of a low-light scene, a long exposure may be needed to adequately obtain the some of the details in the scene. Alternatively or additionally, artistic photographs can be made using long exposures. As an example, the user might want to take a picture of a building at dusk in such a way that the headlights from passing cars appear in a streaked fashion. A long exposure may help the user achieve this goal.

While long exposures of 1000-2000 milliseconds are discussed herein for purpose of example, a "long" exposure may be longer or shorter, and may include any exposure time interval that is greater than the viewfinder refresh time interval.

Figure 3:
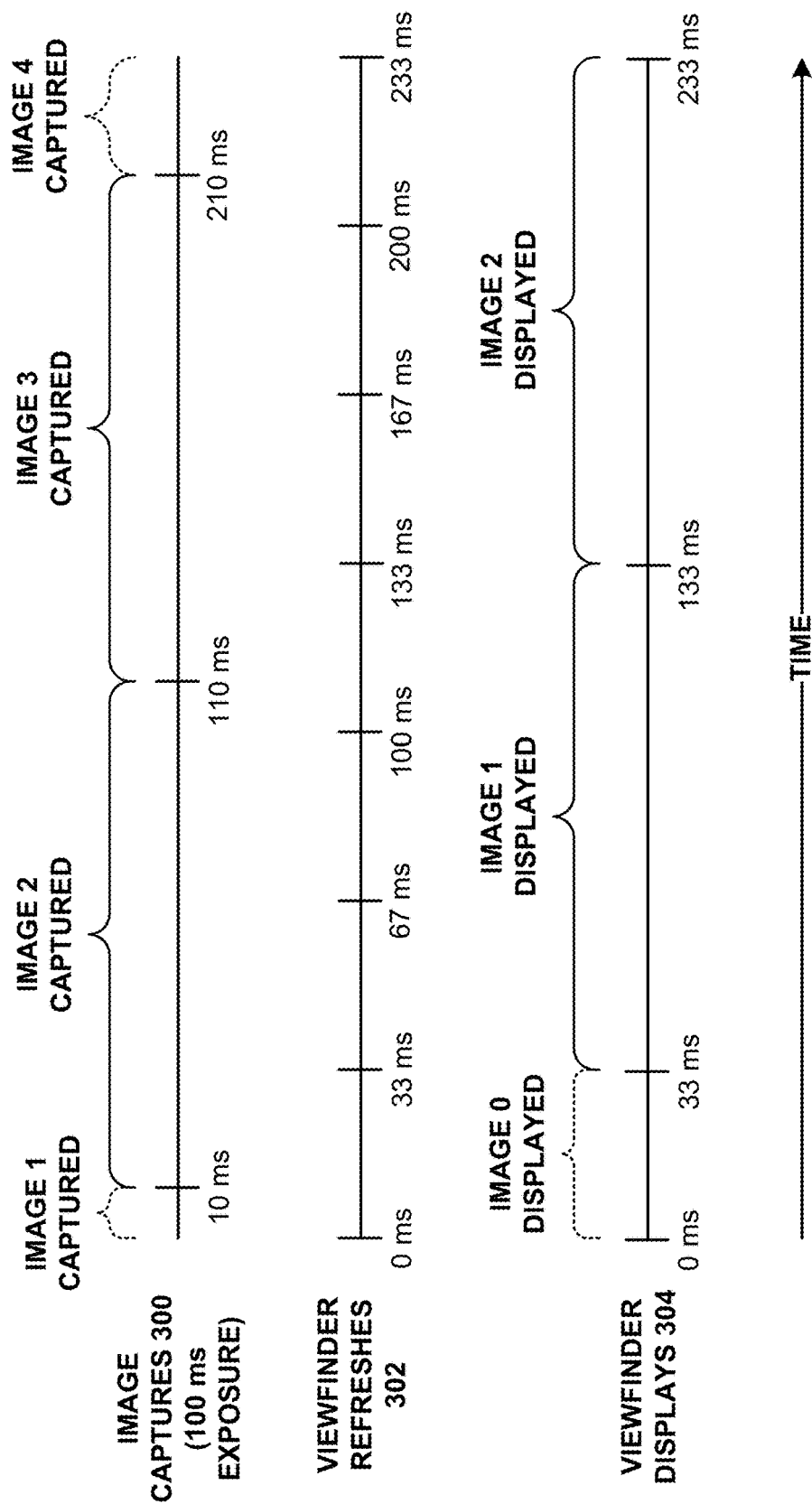
FIG. 3 depicts timing of image captures, according to example embodiments.

FIG. 3 is an example 233 millisecond timing diagram of long exposure image captures 300 compared to viewfinder refreshes 302 and viewfinder displays 304. Image captures 300 includes sequential captures of image 1, image 2, image 3, and image 4 by an image capture device. The exposure time interval of each is 100 milliseconds. As a consequence, the capture of image 1 and image 4 are partially shown, as illustrated with dotted notation in FIG. 3. Although image captures 300 show a subsequent image capture beginning when the previous image capture ends, some embodiments may involve a delay between these events.

Viewfinder refreshes 302 illustrates the timing of when the viewfinder of the image capture device is able to refresh its displayed image. In this example, the refresh rate is 30 Hz, so the refresh time interval is 33.33 milliseconds. For purpose of convenience, the refresh time intervals shown in FIG. 3, and used throughout this specification, may be rounded to the nearest millisecond.

Viewfinder displays 304 illustrate the images displayed during each point in time. Until 33 milliseconds, image 0 is displayed. Image 0 is assumed to be an image that was fully captured prior to when the capture of image 1 began. Since all images have an exposure time interval of 100 milliseconds, if the timing diagram of FIG. 3 was extended to the left, the display of image 0 would begin at −67 milliseconds.

The display of image 1 begins at 33 milliseconds and ends at 133 milliseconds. Since the capture of image 1 ends at 10 milliseconds, the earliest that image 1 can begin to be displayed is at 33 milliseconds, which is the next available viewfinder refresh. Likewise, the display of image 2 begins at 133 milliseconds (the next available viewfinder refresh after the capture of image 2 ends) and ends at 233 milliseconds. Similarly, the display of image 3 (not shown) begins at 233 milliseconds (the next available viewfinder refresh after the capture of image 3 ends) and ends at 333 milliseconds.

The values used in FIG. 3 for the exposure time interval and viewfinder refresh time interval are merely examples. Other values could be used.

As noted above, when an exposure time interval that is longer than the viewfinder refresh time interval is used, as the case in FIG. 3, the images displayed on the viewfinder might not meet the user's expectations. In the example of FIG. 3, the viewfinder displays a new image once every 100 milliseconds. For long enough exposure time intervals (e.g., 100 milliseconds or more) the viewfinder display might no longer appear "live" to the user. In other words, instead of appearing to display a live video capture of the targeted scene, the viewfinder may seem to be displaying a series of infrequently updated still images. Thus, the illusion of a moving picture that is the result of having a viewfinder refresh rate of about 15 Hz or more is broken when the desired exposure time interval is sufficiently longer than the refresh time interval associated with this rate.

3. Example Long Synthetic Exposures

Figure 4:
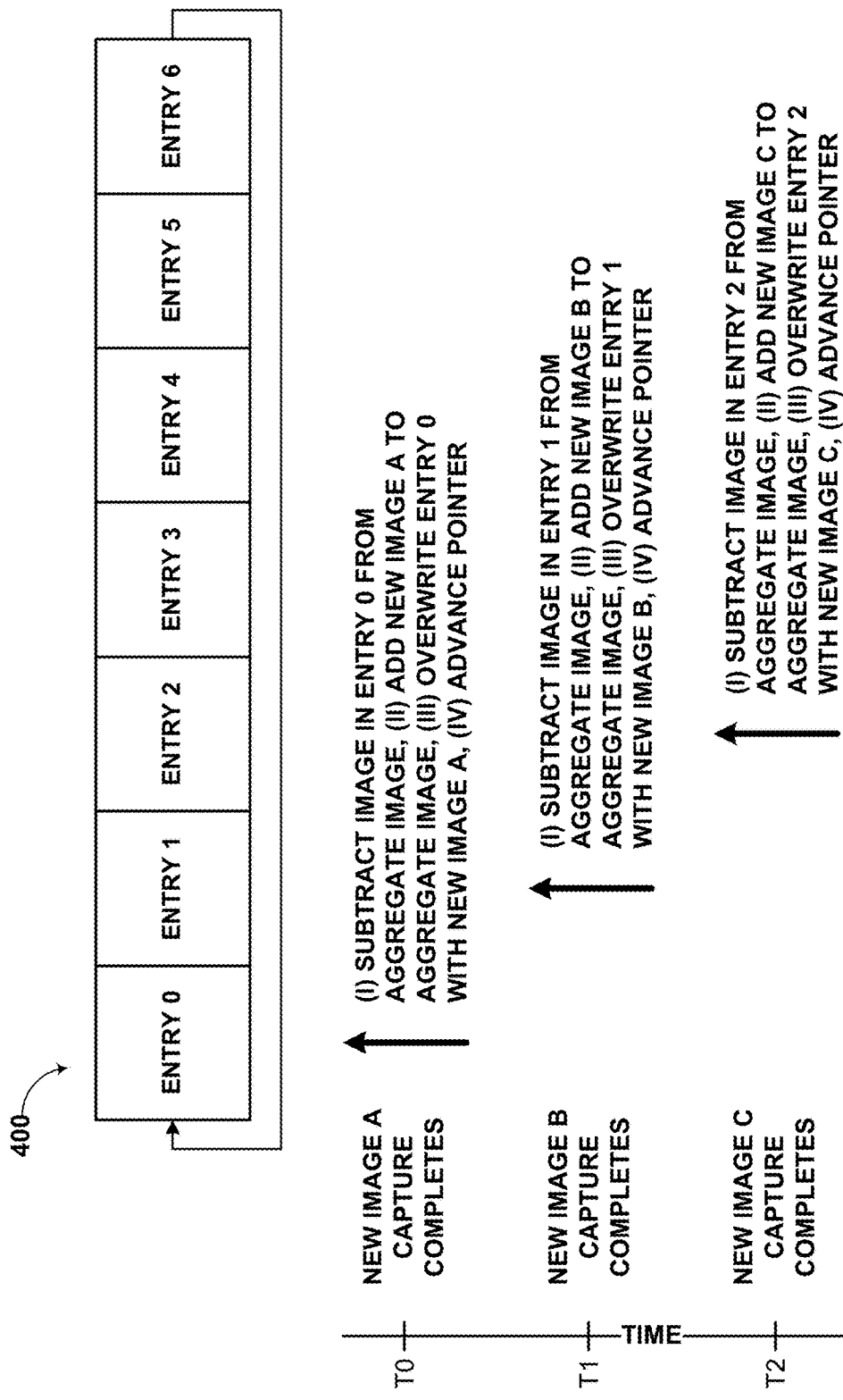
FIG. 4 depicts processing of captured images, according to example embodiments.

FIG. 4 depicts a technique that can be used to address this limitation. Buffer 400 is a ring buffer (also referred to as a circular buffer) with seven entries. Access to buffer 400 occurs on an iterative, wrap-around basis. New data is written to entry 0, then entry 1, entry 2, and so on. When the last entry (in this case entry 6) is written, further new data is written to entry 0, entry 1, etc. This process in which the buffer is sequentially traversed in a circular fashion may continue indefinitely.

A pointer may be used to refer to the next entry to which data is to be written, and this pointer may advance after each entry is written. Once entry 6 is written, the pointer moves to entry 0.

Buffer 400 may be used so that an image capture rate that matches (or approximately matches) the viewfinder refresh rate can be applied. The image capture device stores the m (here m is 7) most-recently captured images in such a ring buffer. The image capture device also stores a running sum (not explicitly shown in FIG. 4) of the images in the ring buffer. The running sum is effectively an aggregate image that represents a synthetic long exposure of the scene in the captured image.

An example of how buffer 400 and the aggregate image can be used to display a live synthetic long exposure is illustrated in FIG. 4. It is assumed that the viewfinder has been active for some time, buffer 400 is full of captured images, and the aggregate image is the sum of these captured images. It is further assumed that the pointer points to entry 0.

At time T0, new image A is captured. In response, the image capture device performs the following steps: (i) the image stored in entry 0 (which is the oldest image in buffer 400) is subtracted from the aggregate image, (ii) new image A is added to the aggregate image, (iii) new image A is written to entry 0 (thus overwriting the oldest image), and (iv) the pointer is advanced to point to entry 1.

Likewise, at time T1, new image B is captured. In response, the image capture device performs the following steps: (i) the image stored in entry 1 (which is the now the oldest image in buffer 400) is subtracted from the aggregate image, (ii) new image B is added to the aggregate image, (iii) new image B is written to entry 1 (thus overwriting the oldest image), and (iv) the pointer is advanced to point to entry 2.

Similarly, at time T2, new image C is captured. In response, the image capture device performs the following steps: (i) the image stored in entry 2 (which is the now the oldest image in buffer 400) is subtracted from the aggregate image, (ii) new image C is added to the aggregate image, (iii) new image C is written to entry 2 (thus overwriting the oldest image), and (iv) the pointer is advanced to point to entry 3.

This process may continue for many iterations, including iterations involving the "wrapping" of the pointer from entry 6 to entry 0 after a new image is written to entry 6. During each iteration, the aggregate image is displayed on the viewfinder. Thus, a live synthetic long exposure, with an exposure time interval defined by the number of entries in buffer 400, is updated once per refresh time interval.

In some embodiments, buffer 400 may be managed differently. In one possible alternative, a newly-captured image may be added to a new entry in buffer 400 before the oldest image therein (and its associated entry) is removed. Thus, in at least some points in time, buffer 400 may have a depth of m+1. In these cases, buffer 400 may be associated with two pointers —one referring to the head of buffer 400 (e.g., the entry containing the most-recently captured image) and the other referring to the tail of buffer 400 (e.g., the entry containing the oldest captured image).

Regardless, using the technique of FIG. 4 or an equivalent technique, any exposure time interval that is a multiple of the viewfinder refresh time interval can be supported. For instance, assuming that the viewfinder refresh rate is 30 Hz, the refresh time interval is 33 milliseconds. As just some possible examples, long exposure time intervals of 67, 133, 200, 400, 600, 800, 1000, and 2000 milliseconds can be supported by adjusting the number of entries in buffer 400 to be 2, 4, 6, 12, 18, 24, 30, and 60, respectively.

When the number of entries in the buffer is 1, the exposure time interval is equal to the viewfinder refresh time interval. Further, arbitrary exposure time intervals less than that of the viewfinder refresh time interval can be supported with a buffer size of 1. For instance, if the viewfinder refresh time interval is 33 milliseconds and the exposure time interval is 20 milliseconds, a 20-millisecond exposure image may be captured once every 33 milliseconds, and the most recently captured image may be displayed by the viewfinder.

Thus, in some embodiments, valid exposure time intervals may take on any value less than or equal to the refresh time interval, or values that are multiples of the refresh time interval. As an example, when the refresh time interval is 33 milliseconds, any exposure time interval greater than 0 milliseconds up to and including 33 milliseconds may be selected. However, if an exposure time interval greater than 33 milliseconds is desired, only values of 67 milliseconds, 100 milliseconds, 133 milliseconds, and so on may be selected.

Figure 5:
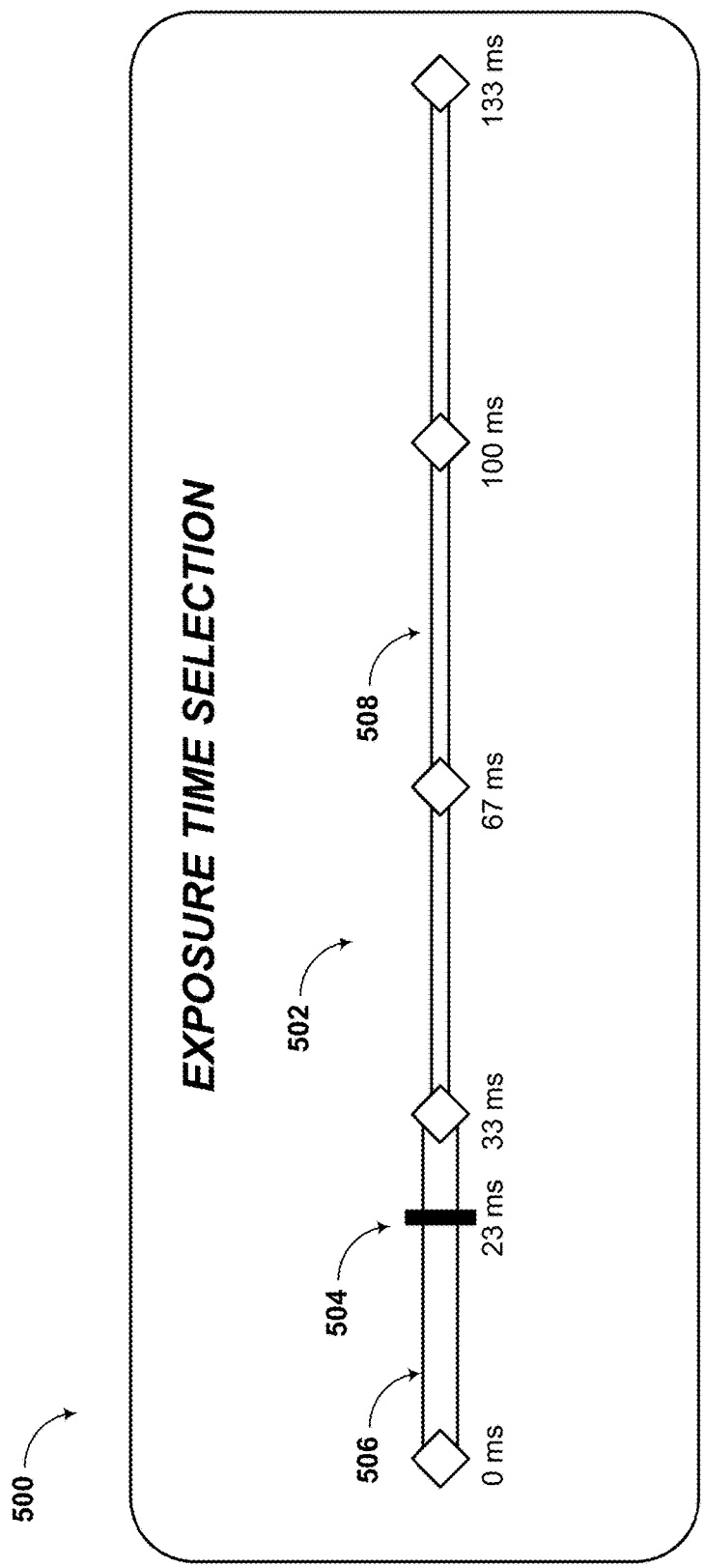
FIG. 5 depicts a user interface, according to example embodiments.

FIG. 5 depicts an example user interface component 500 that illustrates this property. User interface component 500 includes a slider 502 that represents a range of selectable exposure time intervals. Bar 504 represents a default or selected exposure time interval, with the value of this exposure time interval depicted immediately below (in this case, the exposure time interval is 23 milliseconds).

In user interface component 500, multiples of the refresh time interval are designated by diamonds with their respective intervals appearing below. Thus, from left to right, diamonds are shown for refresh time intervals of 0 milliseconds, 33 milliseconds, 67 milliseconds, 100 milliseconds, and 133 milliseconds. For sake of simplicity, user interface component does not explicitly show representations of refresh time intervals greater than 133 milliseconds. Nonetheless, in some embodiments, this sequence of multiples may continue to some arbitrarily high value, such as 1000 or 2000 milliseconds.

User interface component 500 depicts whether arbitrary exposure time intervals are selectable by the width of slider 502. For instance, section 506 of slider 502 is thick, indicating that arbitrary exposure time intervals may be selected. On the other hand, section 508 of slider 502 is thin, indicating that only exposure time intervals represented by diamonds may be selected. Thus, if a user attempts to move bar 504 to a point between 33 milliseconds and 67 milliseconds in section 508, the user interface may prevent such a value from being selected, and/or automatically move bar 504 to the closest diamond on slider 502.

While it is stated above that "arbitrary" exposure time intervals less than the refresh time interval may be selected, in some implementations these exposure time intervals may be limited to discrete values. For instance, in section 506 of slider 502, bar 504 might only be able to select values that are rounded to the nearest second, half second, quarter second, as so on.

User interface component 500 is just one possible representation of how a user interface could allow a user to select an exposure time interval. Other user interface components, designs, layouts, or topologies may be utilized to achieve the same or similar functionality. For instance, dials, knobs, scroll bars, text boxes, or other types of user interface components can be arranged to support the features herein. Further, user interface component 500 may appear on various types of camera devices, such as digital cameras, smartphones, tablet computers, wearable computing devices, and so on.

In alternative embodiments, arbitrary exposure time intervals may be selected even if those exposure time intervals are greater than the refresh time interval. This can be accomplished by applying a synthetic gain (digital or analog) to such captured images.

For instance, let n be the desired exposure time interval, and let r be the refresh time interval, where n>r. The refresh time interval is also the exposure time interval of captured images, as in the arrangement of FIG. 4. The number of whole refresh times interval per exposure time interval is denoted f=∝r, where ∝ is an integer greater than or equal to 1. The value of ∝ also represents the number of captured images that are to be combined to form the live synthetic long exposure image.

As an example, suppose that n=87 milliseconds and r=33.33 milliseconds. There are two whole refresh time intervals, r, in the exposure time interval, n. Thus, ∝=2, and f=2r=66.66. Rounded to the nearest integer, f=67.

The difference between n and f, is 20 milliseconds. This represents the amount of synthetic gain that should be applied to the two captured images in order to accurately represent the brightness of an exposure time interval of n. Dividing this gain equally over the captured images results in a per-image gain of $g=(n-f)/\alpha$ In the example above, the value of g is 10 milliseconds per image.

However, it is convenient to be able to express this value as a multiplier to apply to the pixels of each captured image. Since ∝=f/r, the gain can be expressed as $g=r(n-f)/f$ A scaled multiplier, m, of the gain is given by $$m = \frac{r+g}{r} = \frac{r+r(n-f)/f}{r} = 1 + (n-f)/f$$

In the example above, m is approximately 1.3. Thus, the pixel brightness of each of the two captured images can be multiplied by 1.3 to create images with synthetic exposures of 43.33 milliseconds. When added together to form an aggregate image in accordance with the procedure of FIG. 4, the result is a synthetic long exposure of 86.66 milliseconds, which is a close approximation of the desired long exposure of n=87 milliseconds.

Conveniently, these formulas also work for when n is a multiple of r, so this technique may be used for any value of n that is greater or equal to than r. For instance, suppose that n=100 milliseconds and r=33.33 milliseconds. The term (n−f)/f goes to 0 because n=f, and no synthetic gain is applied to the images.

Figure 6:
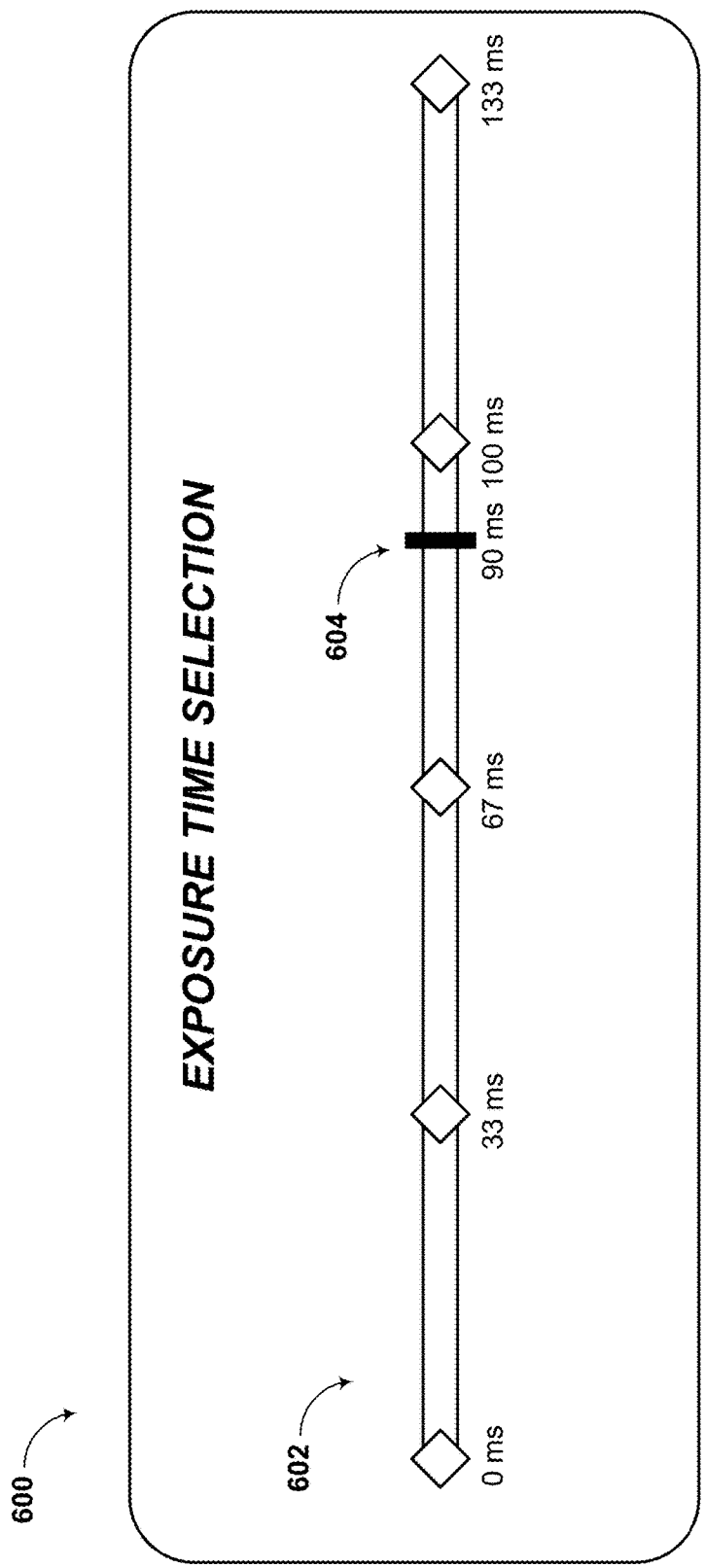
FIG. 6 depicts a user interface, according to example embodiments.

FIG. 6 depicts an example user interface component 600 that facilitates selection of arbitrary synthetic long exposure time intervals. User interface component 600 includes a slider 602 that represents a range of selectable exposure time intervals. Bar 604 represents a default or selected exposure time interval, with the value of this exposure time interval depicted immediately below (in this case, the exposure time is 90 milliseconds).

As was the case for user interface component 500, user interface component 600 displays multiples of the refresh time interval as diamonds with their respective intervals appearing below. But unlike user interface component 500, arbitrary exposure time intervals are selectable. Again, in some implementations, these "arbitrary" exposure time intervals may be limited to discrete values.

User interface component 600 is just one possible representation of how a user interface could allow a user to select an arbitrary synthetic long exposure time interval. Other user interface components, designs, layouts, or topologies may be utilized to achieve the same or similar functionality.

4. Example Operations

Figure 7:
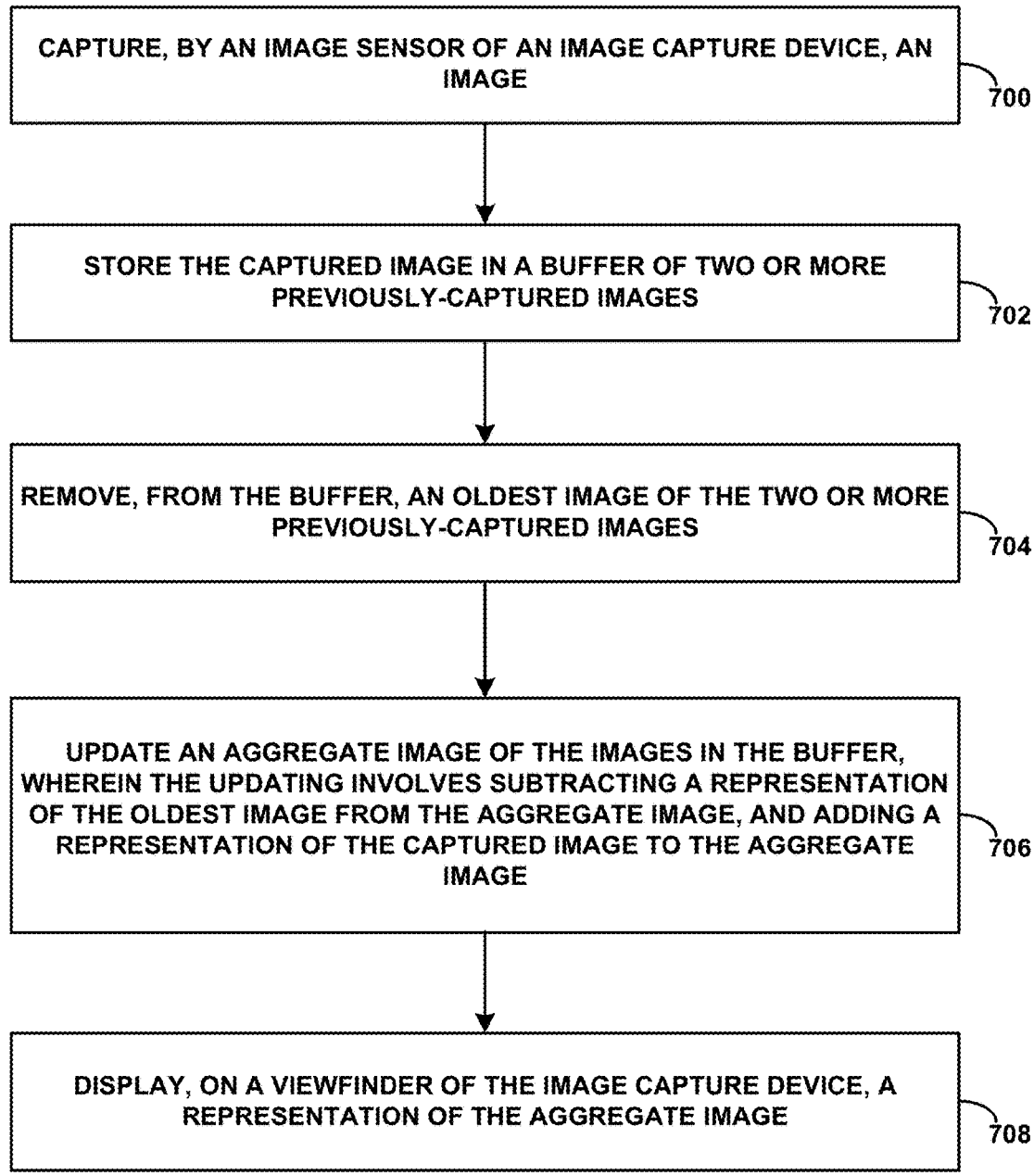
FIG. 7 is a flow chart, according to example embodiments.

FIG. 7 is a flow chart illustrating an example embodiment. This embodiment may be carried out by a computing device, such as digital camera device 100. However, one or more aspects of this embodiment can be carried out by other types of devices or device subsystems. Further, this embodiment may be combined with or may incorporate any aspect or feature disclosed in this specification or the accompanying drawings.

Notably, the steps or blocks of FIG. 7 may occur in orders other than the one shown in the Figure. Particularly, in various embodiments, blocks 702, 704, and 706 may be ordered differently (see, e.g., the embodiment depicted in FIG. 8).

Block 700 of FIG. 7 may involve capturing, by an image sensor of an image capture device, an image.

Block 702 may involve storing the captured image in a buffer of two or more previously-captured images. The captured image and the two or more previously-captured images may be of the same or a similar scene. For instance, the image sensor may be facing the same general direction when capturing these images.

Block 704 may involve removing, from the buffer, an oldest image of the two or more previously-captured images.

Block 706 may involve updating an aggregate image of the images in the buffer. This updating may include subtracting a representation of the oldest image from the aggregate image, and adding a representation of the captured image to the aggregate image. Thus, the aggregate image may be an additive representation of the images in the buffer.

Block 708 may involve displaying, on a viewfinder of the image capture device, a representation of the aggregate image. This representation may be refreshed once per viewfinder refresh time interval. In some embodiments, while the viewfinder is displaying the representation of the aggregate image, the image sensor may capture a further image, which may, in turn, be placed in the buffer and added into the aggregate image.

Updating the aggregate image may include applying image stabilization to the aggregate image. As an example of image stabilization, a hand-held image capture device (e.g., a smartphone) may be used to record a sequence of images of, say, a soccer ball in flight. However, if the user of the image capture device has shaky hands, the resulting video sequence may exhibit frame-to-frame jitter. In order to reduce this jitter, the location of soccer ball within two or more of these images can be matched. Then, image sequence can be adjusted to compensate for the jitter, and make the soccer ball appear to move in a smooth arc. However, image stabilization can also be applied to static scenes in which there is little or no movement.

In some embodiments, the viewfinder of the image capture device has a refresh rate defined by a refresh time interval. The representation of the aggregate image may have a synthetic exposure length defined by a synthetic exposure time interval, where the synthetic exposure time interval is greater than the refresh time interval. In some cases, the synthetic exposure time interval may be at least 1000 milliseconds and the refresh time interval may be less than 150 milliseconds. For instance, the synthetic exposure time interval may be 2000 milliseconds and the refresh time interval may be 33 milliseconds, 67 milliseconds, or 133 milliseconds. Other values are possible.

The buffer may store at least 15 previously-captured images in time order of capture. However, more or fewer previously-captured images may be stored in the buffer, and the number of previously-captured images stored in the buffer may be based on a ratio of the synthetic exposure time interval to the refresh time interval.

In some embodiments, the synthetic exposure time interval may be an integer multiple of the refresh time interval. In these embodiments, the image capture device may provide one or more user interface components configured to receive a selection of the synthetic exposure time interval from a plurality of possible synthetic exposure time intervals that are different integer multiples of the refresh time interval. Particularly, the user interface may limit choice of synthetic exposure time intervals to those that are integer multiples of the refresh time interval. Possibly in response to receiving such a selection, the image capture device may set the synthetic exposure time interval as selected.

In further embodiments, the synthetic exposure time interval is a real-number multiple of the refresh time interval. In these embodiments, the image capture device may provide one or more user interface components configured to receive a selection of the synthetic exposure time interval from a plurality of possible synthetic exposure time intervals that are different real-number multiples of the refresh time interval. Particularly, the user interface may facilitate choice of synthetic exposure time intervals that are integer or real-number multiples of the refresh time interval. Possibly in response to receiving such a selection, the image capture device may set the synthetic exposure time interval as selected.

In some embodiments, n may represent the synthetic exposure time interval, and f may represent a total length of all whole refresh time intervals in the synthetic exposure time interval. Capturing the image of the scene may involve applying an analog or digital gain of approximately $1+(n-f)/f$ to the captured image. The term "approximately" means that the gain may be exactly $1+(n-f)/f$, or deviate by no more than a set value (e.g., 0.10 or 0.25) or by no more than a particular percentage (e.g., 5%, 10%, 20%) from $1+(n-f)/f$.

In some embodiments, zero-shutter-lag (ZSL) image capture may be supported. In some image capture devices, even if a viewfinder is displaying images of a scene, high-resolution payload images of that scene are not being captured and stored until the user triggers the image capture device's shutter function. At that point, the image capture device may carry out focusing and exposure-determining (e.g., auto-exposure) steps. As a result, there can be a noticeable delay between when the shutter function is triggered and an image is captured.

Image capture devices that support ZSL technology may continuously capture high-resolution payload images when the viewfinder is active. When the shutter function is triggered, one or more of the stored images become the "captured image." Thus, for the embodiments herein, the viewfinder may display a low-resolution version of the aggregate image, while a high-resolution version of the image may be used as a payload image. In this fashion, the displayed representation of the aggregate image may be a limited-resolution image, and the previously-captured images and the aggregate image may be full-resolution images. In these embodiments, the image capture device may receive an indication that a shutter function has been triggered, and the image capture device may make the stored aggregate image available to one or more image manipulation applications (e.g., photo gallery applications, social networking applications, and so on).

In some embodiments, the image capture device includes an image processing pipeline that applies tone mapping to captured images. Tone mapping includes various techniques of determining how to represent a large dynamic range of colors and levels of brightness on a medium that supports a smaller dynamic range. Some of these techniques may take into account how colors and brightness are perceived in the human brain to preserve the contrast, but not necessarily the exact color intensities, of neighboring regions of the image. This may entail applying a tone mapping curve to some or all pixel values in captured images. In doing so, the "linearity" of these captured images no longer holds, so summing the pixel values of these images to form the aggregate image may result in the colors and/or brightness of the aggregate image to become skewed.

There are at least two ways in which the embodiments herein can be applied in an image processing pipeline that uses tone mapping. In one, captured images are stored in the buffer and/or the aggregate image without image processing from the pipeline. For instance, before captured images are introduced to the image processing pipeline, copies may be made for the purpose of providing live synthetic long exposure time intervals.

Alternatively, after tone mapping is applied to captured images, this processing may be reversed to obtain versions of the original images for the purpose of providing live synthetic long exposure time intervals. Thus, the image capture device may include an image processing pipeline that applies tone mapping to captured images before storing the captured images in the buffer. Then, after tone mapping is applied and before storing the captured image in the buffer, reverse tone mapping may be applied to images, where the reverse tone mapping removes the tone mapping from the images.

Figure 8:
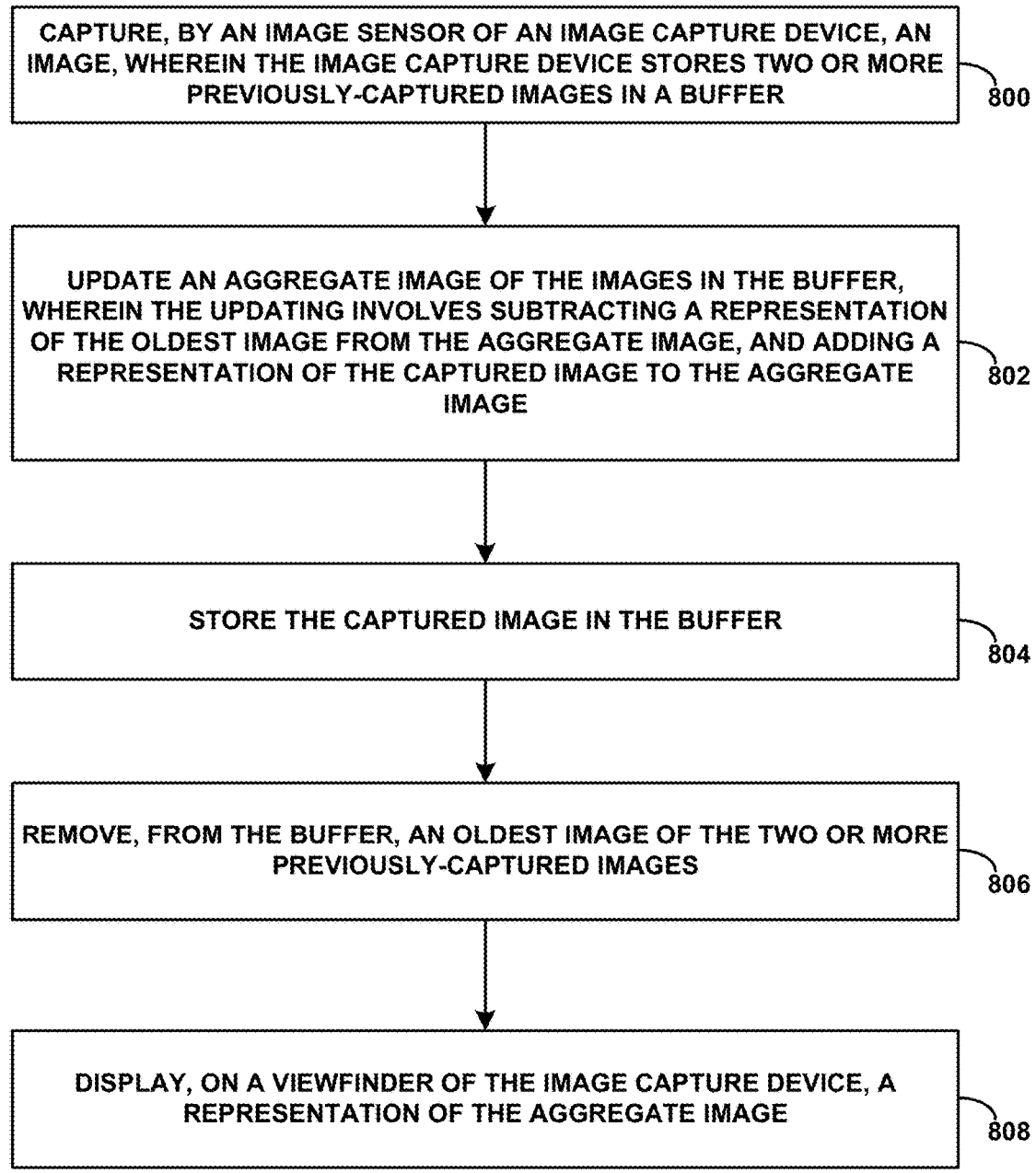
FIG. 8 is a flow chart, according to example embodiments.

FIG. 8 is a flow chart illustrating an example embodiment. This embodiment may be carried out by a computing device, such as digital camera device 100. However, one or more aspects of this embodiment can be carried out by other types of devices or device subsystems. Further, this embodiment may be combined with or may incorporate any aspect or feature disclosed in this specification or the accompanying drawings. For instance, any of the features, variations, or aspects discussed in the context of FIG. 7 may be used in embodiments consistent with FIG. 8.

Block 800 of FIG. 8 may involve capturing, by an image sensor of an image capture device, an image. The image capture device may store two or more previously-captured images in a buffer.

Block 802 may involve updating an aggregate image of the images in the buffer. This updating may include subtracting, from the aggregate image, a representation of the oldest image in the buffer, and adding a representation of the captured image to the aggregate image. Thus, the aggregate image may be an additive representation of the images in the buffer.

Block 804 may involve storing the captured image in the buffer. Block 806 may involve removing, from the buffer, an oldest image of the two or more previously-captured images. In some cases, blocks 804 and 806 may be implemented by overwriting the oldest image with the captured image.

Block 808 may involve displaying, on a viewfinder of the image capture device, a representation of the aggregate image. This representation may be refreshed once per viewfinder refresh time interval.

5. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
    capturing, by an image sensor of an image capture device, an image of a scene;
    storing the captured image in a buffer of two or more previously-captured images of the scene;
    removing, from the buffer, an oldest image of the two or more previously-captured images;
    updating an aggregate image derived from the images stored in the buffer, wherein the aggregate image is based on a running summation of pixel values of the two or more images stored in the buffer, wherein the updating involves subtracting a representation of the oldest image from the aggregate image, and adding a representation of the captured image to the aggregate image, and wherein the running summation represents a live synthetic exposure of the scene; and
    displaying, on a viewfinder of the image capture device, a representation of the aggregate image.

2. The method of claim 1, further comprising:
    while displaying the representation of the aggregate image, capturing a further image of the scene.

3. The method of claim 1, wherein the viewfinder of the image capture device has a refresh rate defined by a refresh time interval, wherein the representation of the aggregate image has a synthetic exposure length defined by a synthetic exposure time interval, wherein the synthetic exposure time interval is greater than the refresh time interval.

4. The method of claim 3, wherein synthetic exposure time interval is at least 1000 milliseconds and the refresh time interval is less than 150 milliseconds.

5. The method of claim 3, wherein the synthetic exposure time interval is an integer multiple of the refresh time interval.

6. The method of claim 5, further comprising:
providing, by the image capture device, one or more user interface components configured to receive a selection of the synthetic exposure time interval from a plurality of possible synthetic exposure time intervals that are different integer multiples of the refresh time interval; and
setting the synthetic exposure time interval as selected.

7. The method of claim 3, wherein the synthetic exposure time interval is a real-number multiple of the refresh time interval.

8. The method of claim 7, further comprising:
providing, by the image capture device, one or more user interface components configured to receive a selection of the synthetic exposure time interval from a plurality of possible synthetic exposure time intervals that are different real-number multiples of the refresh time interval; and
setting the synthetic exposure time interval as selected.

9. The method of claim 7, wherein n represents the synthetic exposure time interval, wherein f represents a total length of all whole refresh time intervals in the synthetic exposure time interval, and wherein capturing the image of the scene comprises:
applying a gain of approximately $1+(n-f)/f$ to the captured image.

10. The method of claim 1, wherein the buffer stores at least 15 previously-captured images in time order of capture.

11. The method claim 1, wherein the displayed representation of the aggregate image is a low-resolution image, and wherein the previously-captured images and the aggregate image are high-resolution images that have higher resolutions than the low-resolution image, the method further comprising:
receiving, by the image capture device, an indication that a shutter function has been triggered; and
storing, in a memory of the image capture device, the aggregate image, such that the aggregate image is available to one or more image manipulation applications.

12. The method of claim 1, wherein the image capture device includes an image processing pipeline that applies tone mapping to captured images, and wherein the captured image is stored in the buffer without image processing from the pipeline.

13. The method of claim 1, wherein the image capture device includes an image processing pipeline that applies tone mapping to captured images before storing the captured images in the buffer, the method further comprising:
after tone mapping is applied and before storing the captured image in the buffer, applying reverse tone mapping to the image, wherein the reverse tone mapping removes the tone mapping from the image.

14. The method of claim 1, wherein updating the aggregate image comprises applying image stabilization to the aggregate image.

15. An article of manufacture including a non-transitory computer-readable medium, having stored thereon program instructions that, upon execution by an image capture device, cause the image capture device to perform operations comprising:
capturing, by an image sensor of the image capture device, an image of a scene;
storing the captured image in a buffer of two or more previously-captured images of the scene;
removing, from the buffer, an oldest image of the two or more previously-captured images;
updating an aggregate image derived from the images stored in the buffer, wherein the aggregate image is based on a running summation of pixel values of the two or more images stored in the buffer, wherein the updating involves subtracting a representation of the oldest image from the aggregate image, and adding a representation of the captured image to the aggregate image, and wherein the running summation represents a live synthetic exposure of the scene; and
displaying, on a viewfinder of the image capture device, a representation of the aggregate image.

16. The article of manufacture of claim 15, wherein the viewfinder of the image capture device has a refresh rate defined by a refresh time interval, wherein the representation of the aggregate image has a synthetic exposure length defined by a synthetic exposure time interval, wherein the synthetic exposure time interval is greater than the refresh time interval.

17. The article of manufacture of claim 16, the operations further comprising:
providing one or more user interface components configured to receive a selection of the synthetic exposure time interval from a plurality of possible synthetic exposure time intervals that are different integer multiples of the refresh time interval; and
setting the synthetic exposure time interval as selected.

18. The article of manufacture of claim 16, the operations further comprising:
providing one or more user interface components configured to receive a selection of the synthetic exposure time interval from a plurality of possible synthetic exposure time intervals that are different real-number multiples of the refresh time interval; and
setting the synthetic exposure time interval as selected.

19. An image capture device comprising:
an image sensor;
a viewfinder;
a processor;
a memory; and
program instructions, stored in the memory, that upon execution by the processor cause the image capture device to perform operations comprising:
capturing, by the image sensor, an image of a scene;
storing the captured image in a buffer of two or more previously-captured images of the scene;
removing, from the buffer, an oldest image of the two or more previously-captured images;
updating an aggregate image derived from the images stored in the buffer, wherein the aggregate image is based on a running summation of pixel values of the two or more images stored in the buffer, wherein the updating involves subtracting a representation of the oldest image from the aggregate image, and adding a representation of the captured image to the aggregate image, and wherein the running summation represents a live synthetic exposure of the scene; and displaying, on the viewfinder, a representation of the aggregate image.

\* \* \* \* \*